US008977701B2

(12) United States Patent
Frenkel et al.

(10) Patent No.: US 8,977,701 B2
(45) Date of Patent: Mar. 10, 2015

(54) PORTFOLIO OPTIMIZATION FOR MEDIA MERCHANDIZING

(71) Applicant: Wetpaint.com, Inc., Seattle, WA (US)

(72) Inventors: Dmitry Frenkel, Bothell, WA (US); Alex David Weinstein, Bellevue, WA (US); Sean Cappello, Seattle, WA (US)

(73) Assignee: Wetpaint.com, Inc., Seattle, WA (US)

( * ) Notice: Subject to any disclaimer, the term of this patent is extended or adjusted under 35 U.S.C. 154(b) by 0 days.

(21) Appl. No.: 14/306,006

(22) Filed: Jun. 16, 2014

(65) Prior Publication Data
US 2014/0297657 A1    Oct. 2, 2014

Related U.S. Application Data

(63) Continuation of application No. 13/802,722, filed on Mar. 14, 2013, now Pat. No. 8,812,608.

(60) Provisional application No. 61/664,666, filed on Jun. 26, 2012.

(51) Int. Cl.
*G06F 15/16* (2006.01)
*G06F 17/30* (2006.01)
(Continued)

(52) U.S. Cl.
CPC .......... *G06F 17/30861* (2013.01); *H04L 41/50* (2013.01); *H04L 67/00* (2013.01); *G06Q 10/1093* (2013.01); *G06Q 50/01* (2013.01)
USPC ................. 709/207; 709/217; 725/9; 725/13; 725/14; 705/14.4

(58) Field of Classification Search
USPC .......... 709/207, 217, 223, 224; 725/9, 13, 14, 725/46, 86; 705/14.4
See application file for complete search history.

(56) References Cited

U.S. PATENT DOCUMENTS 7,596,597 B2 * 9/2009 Liu et al. ...................... 709/204
7,647,306 B2 * 1/2010 Rose et al. ............. 707/999.003
(Continued)

FOREIGN PATENT DOCUMENTS

| KR | 10-2009-0089711 A | 8/2009 |
| KR | 10-2010-0019894 A | 2/2010 |
| KR | 10-2010-0062510 A | 6/2010 |

OTHER PUBLICATIONS

Adams et al., Prime-Time Network Entertainment Programming, Oct. 12, 2007.*
(Continued)

*Primary Examiner* — Jimmy H Tran
(74) *Attorney, Agent, or Firm* — John W. Branch; Lowe Graham Jones PLLC

(57) ABSTRACT

Embodiments are directed towards modifying when to publish content to a channel for distribution based on monitored actions associated with previously published content. A plurality of publishing slots may be determined from a plurality of time slots. Each publishing slot may indicate a time to publish content to the channel. Content may be published to the channel at each of the plurality of publishing slots. User actions associated with the published content may be monitored. The plurality of publishing slots may be ranked based on these monitored actions. At least one of the plurality of publishing slots may be modified to a different time slot based on the rankings of the publishing slots. The publication of content at a publishing slot may be delayed based on a success of other content published at a previous publishing slot being above a threshold.

30 Claims, 9 Drawing Sheets

(51) Int. Cl.
*H04L 12/24* (2006.01)
*H04L 29/08* (2006.01)
*G06Q 10/10* (2012.01)
*G06Q 50/00* (2012.01)

(56) References Cited

U.S. PATENT DOCUMENTS

| | | | |
|---|---|---|---|
| 7,761,346 B2 * | 7/2010 | Cooper et al. | 705/28 |
| 7,774,161 B2 * | 8/2010 | Tischer | 702/176 |
| 8,086,605 B2 * | 12/2011 | Xu et al. | 707/732 |
| 8,135,262 B2 * | 3/2012 | Kusunoki et al. | 386/291 |
| 8,171,128 B2 * | 5/2012 | Zuckerberg et al. | 709/224 |
| 8,255,457 B2 * | 8/2012 | Turner et al. | 709/203 |
| 8,312,140 B2 * | 11/2012 | Zuckerberg et al. | 709/224 |
| 8,412,821 B2 * | 4/2013 | Zuckerberg et al. | 709/224 |
| 8,442,978 B2 * | 5/2013 | Berkhim et al. | 707/732 |
| 8,554,635 B2 * | 10/2013 | England et al. | 705/26.1 |
| 8,671,097 B2 * | 3/2014 | Wu et al. | 707/736 |
| 8,688,781 B2 * | 4/2014 | Taleb et al. | 709/204 |
| 8,700,640 B2 * | 4/2014 | Shivashankar et al. | 707/748 |
| 8,775,603 B2 * | 7/2014 | Hansen | 709/224 |
| 8,782,200 B2 * | 7/2014 | Hansen | 709/224 |
| 8,793,236 B2 * | 7/2014 | Smith et al. | 707/707 |
| 8,812,608 B2 * | 8/2014 | Frenkel et al. | 709/207 |
| 2003/0163817 A1 * | 8/2003 | Han | 725/46 |
| 2004/0093286 A1 * | 5/2004 | Cooper et al. | 705/28 |
| 2004/0172389 A1 * | 9/2004 | Galai et al. | 707/3 |
| 2005/0060759 A1 * | 3/2005 | Rowe et al. | 725/143 |
| 2007/0172196 A1 * | 7/2007 | Kusunoki et al. | 386/83 |
| 2008/0098305 A1 * | 4/2008 | Beland | 715/719 |
| 2008/0167836 A1 * | 7/2008 | Tischer | 702/178 |
| 2009/0012847 A1 * | 1/2009 | Brooks et al. | 705/10 |
| 2009/0132367 A1 * | 5/2009 | Hamada et al. | 705/14 |
| 2009/0144130 A1 * | 6/2009 | Grouf et al. | 705/10 |
| 2009/0158340 A1 * | 6/2009 | Patel et al. | 725/46 |
| 2009/0193485 A1 * | 7/2009 | Rieger et al. | 725/114 |
| 2009/0249409 A1 * | 10/2009 | Bhogal et al. | 725/86 |
| 2010/0057534 A1 * | 3/2010 | Gershkoff | 705/10 |
| 2010/0262485 A1 * | 10/2010 | Cho | 705/14.42 |
| 2011/0154390 A1 * | 6/2011 | Smith | 725/32 |
| 2011/0185378 A1 * | 7/2011 | Johnson | 725/25 |
| 2011/0314007 A1 * | 12/2011 | Dassa et al. | 707/723 |
| 2012/0089698 A1 * | 4/2012 | Tseng | 709/217 |
| 2012/0110202 A1 * | 5/2012 | Niman | 709/231 |
| 2012/0131013 A1 * | 5/2012 | Hobbs et al. | 707/748 |
| 2012/0137316 A1 * | 5/2012 | Elizarov et al. | 725/9 |
| 2012/0137317 A1 * | 5/2012 | Elizarov et al. | 725/13 |
| 2012/0191841 A1 * | 7/2012 | Swamidas et al. | 709/224 |
| 2013/0074109 A1 * | 3/2013 | Skelton et al. | 725/14 |
| 2013/0081085 A1 * | 3/2013 | Skelton et al. | 725/46 |
| 2013/0145400 A1 * | 6/2013 | Chang et al. | 725/53 |
| 2013/0268989 A1 * | 10/2013 | Lawson et al. | 725/118 |
| 2014/0222578 A1 * | 8/2014 | Poornachandran et al. | 705/14.61 |
| 2014/0222927 A1 * | 8/2014 | Glazer et al. | 709/204 |

OTHER PUBLICATIONS

Official Communication for U.S. Appl. No. 13/802,722 mailed Jul. 31, 2013 (13 pages).
Official Communication for U.S. Appl. No. 13/802,722 mailed Jan. 17, 2014 (16 pages).
Official Communication for U.S. Appl. No. 13/802,722 mailed Mar. 31, 2014 (8 pages).
International Search Report and Written Opinion for PCT/US2013/031726 mailed Jun. 24, 2013 (10 pages).

* cited by examiner

|  | Monday | Tuesday | Wednesday | Thursday | Friday | Saturday | Sunday | Monday |
|---|---|---|---|---|---|---|---|---|
| 8:00 AM | | | | | | | | |
| 8:30 AM | X | X | X | X | X | X | X | X |
| 9:00 AM | X | X | X | X | X | X | X | X |
| 9:30 AM | X | X | X | X | X | X | X | X |
| 10:00 AM | | | | | | | | |
| 10:30 AM | | | | | | | | |
| 11:00 AM | | | | | | | | |
| 11:30 AM | | | | | | | | |
| 12:00 PM | X | X | X | X | X | X | X | X |
| 12:30 PM | X | X | X | X | X | X | X | X |
| 1:00 PM | | | | | | | | |
| 1:30 PM | | | | | | | | |
| 2:00 PM | | | | | | | | |
| 2:30 PM | | | | | | | | |
| 3:00 PM | | | | | | | | |
| 3:30 PM | | | | | | | | |
| 4:00 PM | | | | | | | | |
| 4:30 PM | X | X | X | X | X | X | X | X |
| 5:00 PM | X | X | X | X | X | X | X | X |
| 5:30 PM | X | X | X | X | X | X | X | X |
| 6:00 PM | X | X | X | X | X | X | X | X |
| 6:30 PM | | | | | | | | |
| 7:00 PM | | | | | | | | |

FIG. 7

|  | Monday | Tuesday | Wednesday | Thursday | Friday | Saturday | Sunday | Monday |
|---|---|---|---|---|---|---|---|---|
| 8:00 AM |  |  |  |  |  |  |  |  |
| 8:30 AM | X |  |  |  |  |  |  |  |
| 9:00 AM | X | X |  | X |  |  |  | X |
| 9:30 AM |  |  |  |  |  |  |  | X |
| 10:00 AM |  |  |  |  |  |  |  | X |
| 10:30 AM |  |  |  |  |  |  |  |  |
| 11:00 AM |  |  |  |  |  |  |  |  |
| 11:30 AM | X | X | X | X |  |  |  | X |
| 12:00 PM |  | X |  | X | X | X | X |  |
| 12:30 PM |  | X |  |  | X |  |  |  |
| 1:00 PM |  |  |  |  |  |  |  |  |
| 1:30 PM |  |  |  |  |  |  |  |  |
| 2:00 PM | X |  | X |  |  | X |  |  |
| 2:30 PM |  |  |  |  |  |  |  |  |
| 3:00 PM |  |  |  |  |  | X |  |  |
| 3:30 PM |  |  |  |  | X |  |  |  |
| 4:00 PM |  |  | X | X | X |  |  | X |
| 4:30 PM |  | X | X |  |  |  |  |  |
| 5:00 PM | X | X | X |  |  |  | X |  |
| 5:30 PM | X | X | X |  |  |  |  |  |
| 6:00 PM | X |  | X |  |  |  |  | X |
| 6:30 PM |  |  |  |  |  |  |  | X |
| 7:00 PM |  |  |  |  |  |  |  | X |

FIG. 8

PORTFOLIO OPTIMIZATION FOR MEDIA MERCHANDIZING

CROSS REFERENCE TO RELATED APPLICATIONS

This utility patent application is a Continuation claiming the benefit under 35 U.S.C. §120 of allowed U.S. patent application Ser. No. 13/802,722, filed on Mar. 14, 2013, entitled "Portfolio Optimization for Media Merchandizing," which is a non-provisional patent application claiming the benefit under 35 U.S.C. §119(e) of U.S. Provisional Patent Application, Ser. No. 61/664,666 filed on Jun. 26, 2012, entitled "Portfolio Optimization for Media Merchandizing," all of which are incorporated herein by reference.

TECHNICAL FIELD

The present invention relates generally to content management, and more particularly, but not exclusively, to the optimization of when to publish content based on user actions.

BACKGROUND

The business model of the publishing industry has remained relatively stable throughout the majority of the 20$^{th}$ century. Content providers typically utilized a model that can be best described as "high-quality journalistic art," where a group of talented writers and editors immerse themselves in topical areas that are of interest to the targeted demographic. They then create content that fits within the general boundaries defined by the interests of the target audience. On the other side, an audience can establish affinity to the publisher by waiting for their favorite authors to publish the next article, or by reading only about the topics they care about. Over time, a deep and personal relationship may be established between a publisher and its audience.

In general, the introduction of the Internet has lowered the barrier to entry for publishers, widening the variety of choices for consumers and effectively commoditizing content. Increased competition for consumers' attention can shortened consumption time per consumer for a publisher, which can create a challenging environment for publishers to maintain the deep personal relationships with consumers that they once enjoyed. With the introduction of social networks, this deep relationship can be re-established—achieving both wider consumer reach and deeper consumer relationships, which in turn drives increased site traffic and ad impressions. But personalization and optimization of content delivery to the audience remains challenging. It is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 7 shows a use case illustration of an embodiment of a plurality of tune slots and publishing slots for determining when to publish content to a channel;

FIG. 8 shows a use case illustration of an alternative embodiment of a plurality of time slots and publishing slots for determining when to publish content to a channel.

DETAILED DESCRIPTION

Figure 1:
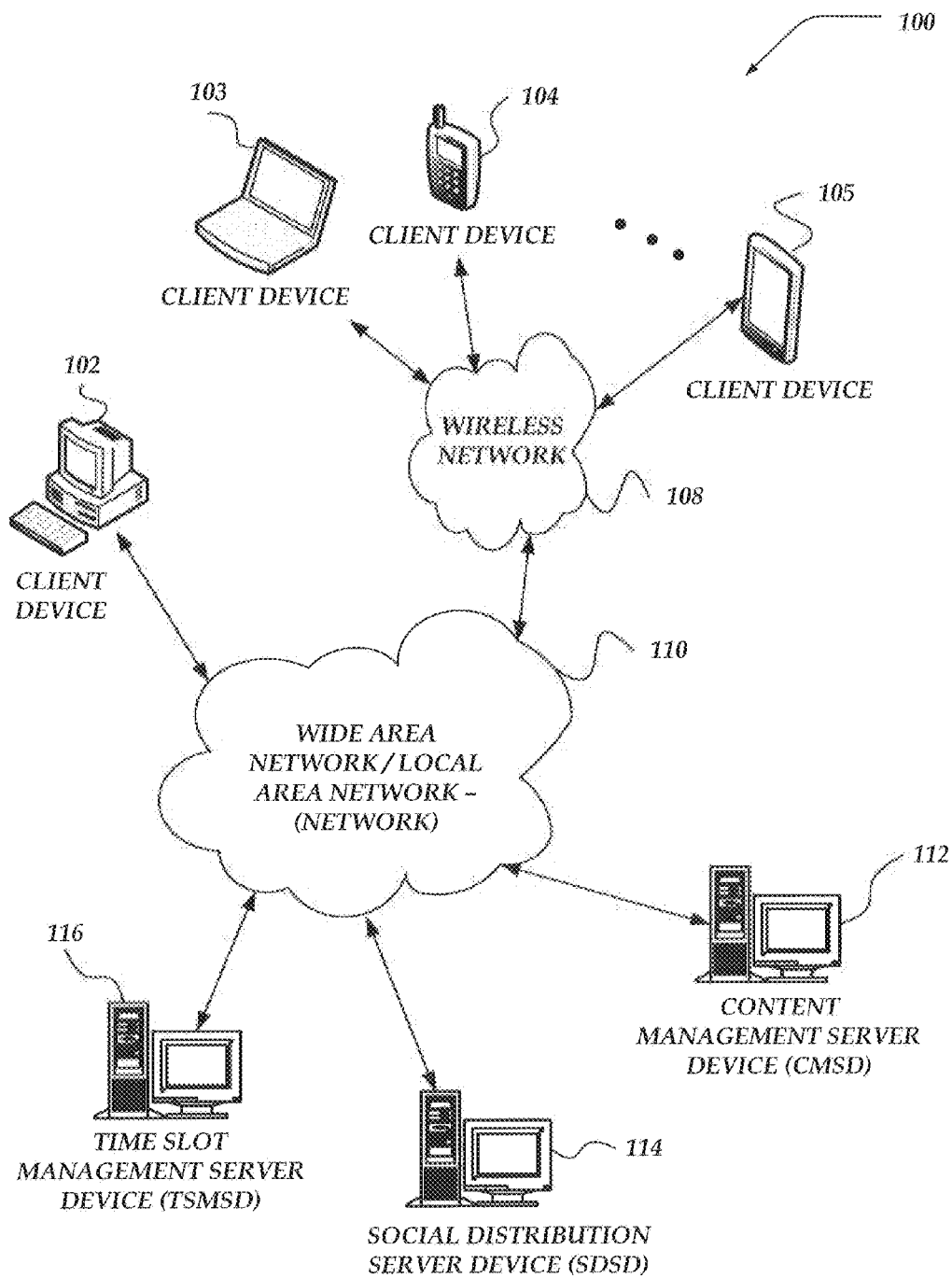
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" refers to digital data that may be communicated over a network to be remotely displayed by a computing device. Non-exhaustive examples of content include but are not limited to articles, blogs, movies, videos, music, sounds, pictures, illustrations, graphics, images, text, or the like. Content may also include summaries, briefs, snippets, headlines, or the like, of the content. In at least one embodiment, content may also include links, hyperlinks, or the like, to additional content. For example, a piece of content may be a post to a social media page, where the post includes a heading and a link to an article. In some embodiments, a plurality of content for publication to one or more channels may be referred to as a portfolio. Such publication may be referred to, in some embodiments, as media merchandizing.

In some embodiments, each piece of content may include one or more features of the content. These features may include, for example, a subject, topic, theme, type of content, content form (e.g., news report, investigation report, breaking news report, editorial piece, opinion piece, or the like) trend, character, person, keyword, date of creation, author, publisher/poster, or the like. Features may also include content structure indicators, such as, for example, presence and/or number of questions directed at the audience, presence and/or number of emotional statements, headline form (e.g., statement, question, emotional statement, or the like), or the like. In at least one of various embodiments, the features of a piece of content may also include traffic achieved for the content on a channel (i.e., a channel that the content is posted/provided), which may include statistics and other information about the content, such as, for example, amount of editing time, publication date and/or time, time a visitor accesses the content, number of online "hits" that he content receives (e.g., number of clicks, click rate, or the like), vitality (e.g., number of shares), engagement of users (e.g., number of comments), exit rate from page, or the like.

Features may also include an aspect, characteristic, and/or substance of a piece of content that can be modified. In at least one embodiment, features may indicate how the content should be displayed to a user. For example, in some embodiments, the feature may indicate a format of the content, such as, for example, font color, font size, capitalization utilization, image size, image quality, or the like. However, in other embodiments, the features may indicate whether or not to include an image, whether an audience poll is including with the content, whether the content should be provided in the form of a question, or the like. In another embodiment, the features may indicate a keyword to include with the content, such as, for example, "breaking news," "just in," or the like. These keywords may also include a name associated with the content, such as person discussed in the content, a show/episode title, article title, or the like.

As used herein, the term "channel" refers to a method of providing and/or otherwise distributing content from a publisher to a user. Channels may include, but are not limited to, email messages, text messages, web pages, social media pages, social media messages, physical medium including mailings, billboard displays, television, telephone calls, or the like. Non-limiting, non-exhaustive examples of providing content to a user through a channel may include posting content or a link to content on a social media page, sending an email with content to a user, or the like. In some embodiments, users may subscribe to a channel by requesting content from a publisher through a channel, by signing up with a channel (e.g., signing up with an email distribution list), becoming a member of the channel (e.g., becoming a member of the publisher's social media page), or the like. Subscribing to a channel may be tree or may include a monetary coat, which may be charged to a user and/or offset by advertising. In some embodiments, content may be posted and/or otherwise provided to a channel for one or more users. In other embodiments, content may be provided through a channel to one or more users.

As used herein, the term "time slot" may refer to a given time for a channel in which content can be published and/or otherwise provided to the channel. In some embodiments, a plurality of time slots may be determined tor a time interval, such as a day, a week, a month, or the like. In at least one of various embodiments, a time interval may repeat, such as periodically or at a given frequency. For example, a time interval of one week may repeat week after week. In another non-limiting, non-exhaustive example, the time intervals may be each weekday, such that there are no time slots on the weekend. However, embodiments are not so limited and other time intervals may be employed. For example, in some other embodiments, a time interval may be divided into a plurality of time sub-intervals. For example, a time interval of one week may be divided into time sub-intervals of one day—so each day of the week is a time sub-interval.

In some embodiments, a channel may include one or more categories, of which each category for the channel may include independent time slots. For example, a sports channel may include different categories corresponding to different types of sports, such as, hockey, soccer, baseball, or the like. Each of these different categories for the different sports types may include different time slots. In some embodiments, the time slots and/or time intervals for each channel and/or each category of a channel may be different and/or independent of time slots and/or time intervals of other channels and/or categories. In at least one embodiment, the categories of a channel may be based on features of the content provided to the channel.

As used herein, the term "publishing slot" may refer to a time slot when content is published to the channel and/or when content is scheduled to be published to the channel. For example, the time slots for a given time interval may every 30 minutes on the hour and half-hour for each day. If content is published or scheduled to be published at the 11:00 AM time slot, then this time slot may be a publishing slot. In at least one embodiment, a time slot that does not have a corresponding publishing slot may be referred to as an unused time slot, currently unused time slot, or an available time slot.

As used herein, the terms "monitored actions", "user actions", or "monitored user actions" may refer to user interactions or other information obtained regarding published content. These actions may also be referred to as audience actions. Monitored actions may include, but are not limited to, a number of user clicks, a number of times users' share the content, a number of user comments, a time accessing the content and/or the containing channel, revenue obtained from advertising associated with the content (e.g., advertisements shown alongside the content), revenue obtained directly from the user, or the like. In at least one embodiment, the actions may be monitored and/or collected tor a given period of time. In some embodiments, monitored actions may be utilized to determine a success of content.

As used herein, the terms "success" and/or "overall success" may refer to a metric and/or value that indicates how successful content and/or features are—or how well content/features perform—on a given channel or plurality of channels. In at least one embodiment, the success of content may be represented as a value, such that a success of one piece of content can be compared to another piece of content. In some embodiments, this value may be a rate and/or average at which the monitored actions occur. Examples, of such rates, may include a number of clicks per week, a number of times users' share the piece content per week, a number of comments per week, an average time viewing a piece of content, or the like.

In some embodiments, success may also include a number of transfers received for published content. In at least one embodiment, content published to a channel may be a preview of a full version. A transfer may be an event that occurs when a user who is consuming a content preview clicks through to the publisher's website via a published link to see a full version of the content (e.g., a story).

In some embodiments, a greater value of success for a piece of content may indicate that that piece of content was more successful than another piece of content with a lower value of success. For example, Content_A may have 88 user clicks over a given period of time and Content_B may have 65 clicks for the same given period of time. Since Content_A has more user clicks, Content_A may be determined to be more successful than Content_B.

Other examples of successes may include, bur are not limited to, a number of times the content was accessed by a user, how long a user accessed the content, whether a user shared the content, features of the content, comments and/or posts provided by users about the content, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to modifying when to publish content to a channel tor distribution based on monitored actions associated with previously published content. In some embodiments, a plurality of publishing slots may be determined and/or selected from a plurality of available time slots. Each publishing slot may indicate a corresponding time slot for publishing content over at least one channel. In at least one of various embodiments, the time slots may be disbursed over a time interval (e.g., one week), which may continuously repeat (e.g., week after week). In some embodiments, the time interval may have a plurality of time sub-intervals, such as, for example, the days of the week. In at least one of various embodiments, the plurality of publishing slots may be disbursed over the plurality of time sub-intervals based on constraints of each time sub-interval. Examples of such constraints include, but are not limited to, a minimum number of publishing slots on a given day, a maximum number of publishing slots on a given day, or the like.

Content may be published to the channel at each of the plurality of publishing slots. After one or more content pieces are published at each publishing slot, user actions associated with each published content may be monitored. The plurality of publishing slots may be ranked based on these monitored actions. At least one of the plurality of publishing slots may be modified to a different time slot based on the rankings of the publishing slots. Such modifications may include, moving a lower ranking publishing slot to an available time slot proximate to a higher ranking publishing slot, moving a lowest ranking publishing slot to an available time slot that is between two other publishing slots that have a highest average ranking, or the like. In some other embodiments, each of the plurality of available time slots that are unused as publishing slots may be ranked based at least on a corresponding distance to the plurality of publishing slots and the ranking of the plurality of publishing slots. In at least one such embodiment, a lowest ranking publishing slot may be moved to a highest ranking unused time slot.

In some embodiments, the publication of content at a publishing slot may be delayed. In at least one embodiment, a success of content published at a publishing slot may be determined based on monitored actions associated with the content. If the monitored actions are above a threshold at a next published slot, then the publication of other content at the next publishing slot may be delayed. In some embodiments, a delayed publishing slot may be delayed up to a next publishing slot, at which point publication of the other content at the delayed publishing slot may be canceled and the other content may be published at the next publishing slot after the delayed publishing slot.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client devices 102-105, Content Management Server Device (CMSD) 112, Social Distribution Server Device (SDSD) 114, and Time Slot Management Server Device (TSMSD) 116.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WML-Script, JavaScript, Standard Generalized Markup Language (SGML), HyperText Markup Language (HTML), eXtensible Mark up Language (XML), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send, receive, and/or otherwise access content, or the like. The client application may further provide information that identifies itself, including a type, capability, name, and the like. In one embodiment, client devices 102-105 may uniquely identify themselves through any of a variety of mechanisms, including an internet Protocol (IP) address, a phone number, Mobile Identification Number (MIN), an electronic serial number (ESN), or other device identifier. Such information may be provided in a network packet, or the like, sent between other client devices, SDSD 114, or other computing devices.

Client devices 102-105 may further be configured to include a client application that enables an end-user to log into an end-user account that may be managed by another computing device, such as SDSD 114, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection tor client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client devices 103-105 and another computing device, network, and the like.

Network 110 is configured to couple network devices with other computing devices, including, CMSD 112, SDSD 114, TSMSD 116, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber lanes (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of CMSD 112 is described in more detail below in conjunction with FIG. 3. Briefly, however, CMSD 112 includes virtually any network device capable of managing a plurality of content. In some embodiments, CMSD 112 may manage and/or store which channel(s) the content has been provided/published. In at least one embodiment, CMSD 112 may manage and/or store publishing slot of when the content was published to the channel.

In other embodiments, CMSD 112 may monitor and/or collect actions provided by users on the content, such as a number of clicks, user comments, or the like. In some embodiments, CMSD 112 may be enabled to analyze the monitored actions to determine one or more successes and/or metrics associated with the content. CMSD 112 may store the determined successes and/or metrics for the content. Examples of successes may include, but is not limited to, a number of times the content was accessed by a user, how long a user accessed the content, whether a user shared the content, comments and/or posts provided by users about the content, or the like.

Devices that may be arranged to operate as CMSD 112 include various network devices, including, but not limited to personal computers, desktop computers, multiprocessor systems, microprocessor-based or programmable consumer electronics, network PCs, server devices, network appliances, and the like.

Although FIG. 1 illustrates CMSD 112 as a single computing device, the invention is not so limited. For example, one or more functions of the CMSD 112 may be distributed across one or more distinct network devices. Moreover, CMSD 112 is not limited to a particular configuration. Thus, in one embodiment, CMSD 112 may contain a plurality of network devices. In another embodiment, CMSD 112 may contain a plurality of network devices that operate using a master/slave approach, where one of the plurality of network devices of CMSD 112 operates to manage and/or otherwise coordinate operations of the other network devices. In other embodiments, the CMSD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of SDSD 114 is described in more detail below in conjunction with FIG. 3. Briefly, however, SDSD 114 includes virtually any network device capable of enabling a publication of content to one or more channels, at one or more publishing slots, or the like. SDSD 114 may be enabled to communicate with TSMSD 116 and/or CMSD 112. In some embodiments, SDSD 114 may be enabled to monitor actions associated with the published content and store it at CMSD 112. In other embodiments, SDSD 114 may communicate with TSMSD 116 to determine when to publish content to a channel.

Devices that may be arranged to operate as SDSD 114 include various network devices, including, but not limited to personal computers, desktop computers, multiprocessor systems, microprocessor-based or programmable consumer electronics, network PCs, server devices, network appliances, and the like.

Although FIG. 1 illustrates SDSD 114 as a single computing device, the invention is not so limited. For example, one or more functions of the SDSD 114 may be distributed across one or more distinct network devices. Moreover, SDSD 114 is not limited to a particular configuration. Thus, in one embodiment, SDSD 114 may contain a plurality of network devices. In another embodiment, SDSD 114 may contain a plurality of network devices that operate using a master/slave approach, where one of the plurality of network devices of SDSD 114 operates to manage and/or otherwise coordinate operations of the other network devices. In other embodiments, the SDSD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of TSMSD 116 is described in more detail below in conjunction with FIG. 3. Briefly, however, TSMSD 116 includes virtually any network device capable of managing and/or storing a plurality of time slots and/or publishing slots. In some embodiments, TSMSD 116 may communicate with CMSD 112 and/or SDSD 114 to obtain monitored actions and/or successes of content. TSMSD 116 may be configured to modify publishing slots and/or delay publication of content based on the monitored actions.

Devices that may be arranged to operate as TSMSD 116 include various network devices, including, but not limited to personal computers, desktop computers, multiprocessor systems, microprocessor-based or programmable consumer electronics, network PCs, server devices, network appliances, and the like.

Although FIG. 1 illustrates TSMSD 116 as a single computing device, the invention is not so limited. For example, one or more functions of the TSMSD 116 may be distributed across one or more distinct network devices. Moreover, TSMSD 116 is not limited to a particular configuration. Thus, in one embodiment, TSMSD 116 may contain a plurality of network devices. In another embodiment, TSMSD 116 may contain a plurality of network devices that operate using a master/slave approach, where one of the plurality of network devices of TSMSD 116 operates to manage and/or otherwise coordinate operations of the other network devices. In other embodiments, the TSMSD 116 may operate as a plurality of network devices within a cluster architecture, a peer-to-peer architecture, and/or even within a cloud architecture. Thus, the invention is not to be construed as being limited to a single environment, and other configurations, and architectures are also envisaged.

Although Illustrated separately, the functionality of CMSD 112, SDSD 114, and TSMSD 116 may be performed by a single device, different devices, different combinations of devices, or the like.

Illustrative Client Device

Figure 2:
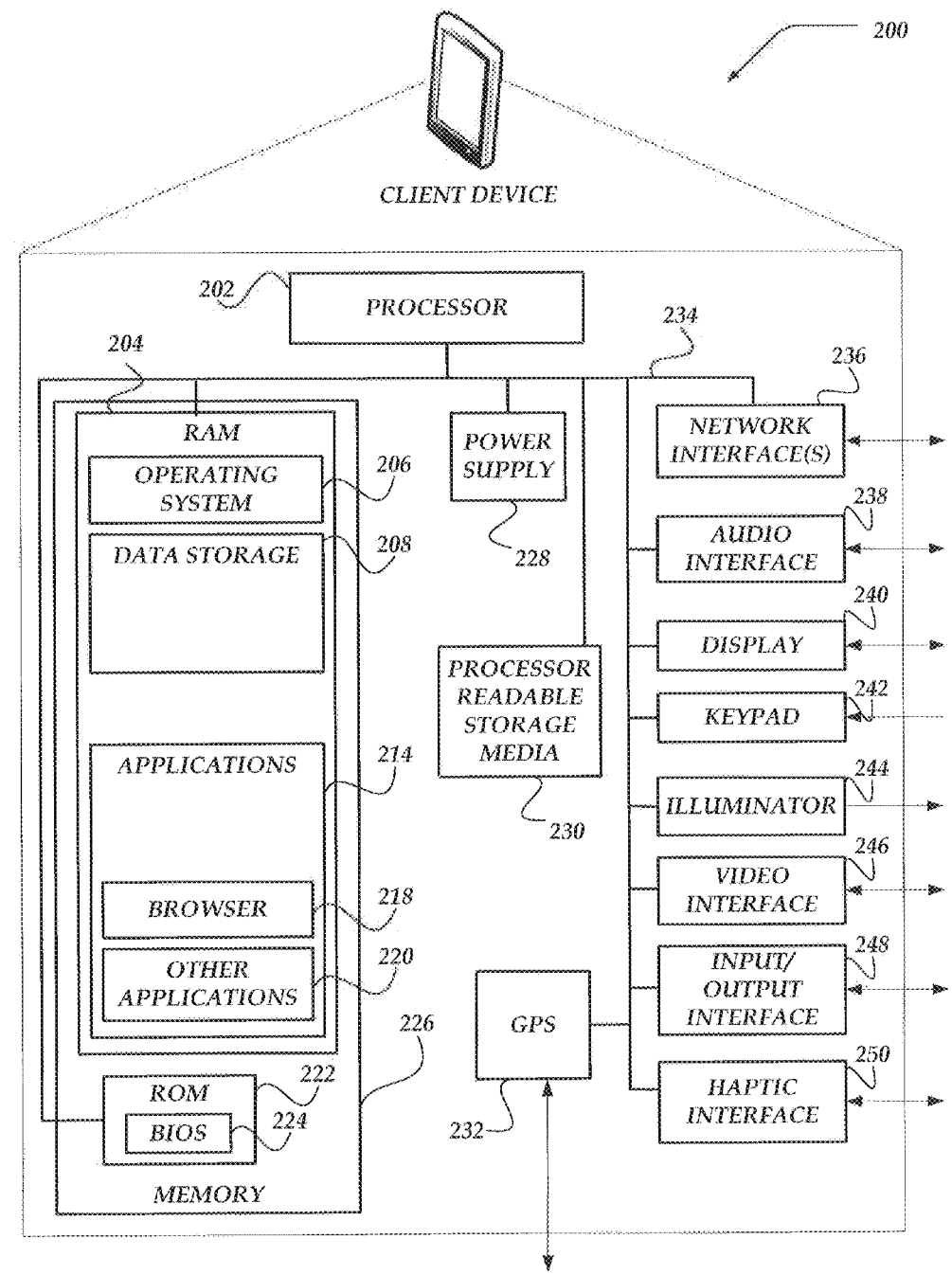
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with a mass memory 226 via a bus 234. In some embodiments, processor 202 may include one or more central processing units (CPU). Client device 200 also includes a power supply 228, one or more network interfaces 236, an audio interlace 238, a display 240, a keypad 242, an illuminator 244, a video interface 246, an input/output interface 248, a haptic interface 250, and a global positioning system (GPS) receiver 232.

Power supply 228 provides power to client device 200. A rechargeable or non-rechargeable battery may be used to provide power. The power may also be provided by an external power source, such as an alternating current (AC) adapter or a powered docking cradle that supplements and/or recharges a battery.

Client device 200 may optionally communicate with a base station (not shown), or directly with another computing device. Network, interface 236 includes circuitry tor coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interlace 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interlace 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information mat describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of network device 200, including, but not limited to processor readable storage media 230, a disk drive or other computer readable storage devices (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media and/or computer readable storage device.

Applications 214 may include computer executable instructions which, when executed by client device 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client device. Applications 214 may include, for example, browser 218, and other applications 220. Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, other content, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as CMSD 112, SDSD 114, and/or TSMSD 116 of FIG. 1.

Illustrative Network Device

Figure 3:
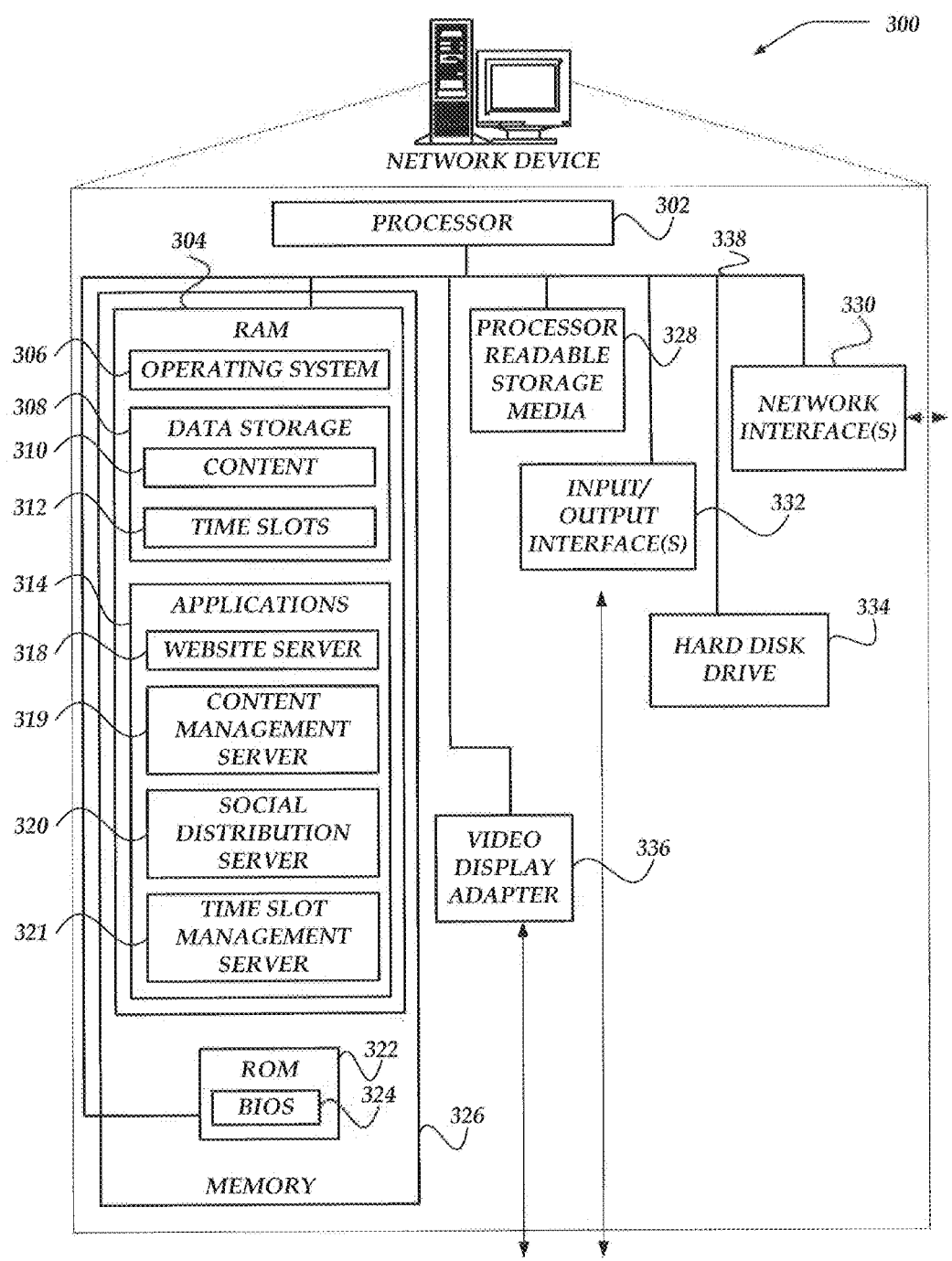
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example CMSD 112, SDSD 114, TSMSD 116 of FIG. 1—a combination of those devices—and/or other network devices.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interlace unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system (BIOS) 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like.

Data store 308 may also include content 310 and time slots 312. Content 310 may include a plurality of pieces of content. In some embodiments, content 310 may include other data associated with each piece of content, such as, for example, a success of the content, history of actions performed by users on the content, features of the content, channel the content was published to, a publishing slot associated with the publication of the content, or the like. In at least one embodiment content may be associated with a unique identifier. In some embodiments, the unique identifier may be utilized to obtain and/or store actions associated with the content. Time slots 312 may include a plurality of time slots. Time slots 312 may also include an indication of which time slots are publishing slots, available time slots, or the like.

Applications 314 may include computer executable instructions, which may be loaded into mass memory and run on operating system 306. Examples of application programs may include transcoders, schedulers, calendars, database programs, word processing programs. Hypertext Transfer Protocol (HTTP) programs, customizable user interface programs, IPSec applications, encryption programs, security programs, SMS message servers, IM message servers, email servers, account managers, and so forth. Applications 314 may also include website server 318, Content Management Server (CMS) 319, Social Distribution Server (SDS) 320, and Time Slot Management Server (TSMS) 321.

Website server 318 may represents any of a variety of information and services that are configured to provide content, including messages, over a network to another computing device. Thus, website server 318 can include, for example, a web server, a File Transfer Protocol (FTP) server, a database server, a content server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

CMS 319 may be configured to manage a plurality of content, such as content 310. In at least one embodiment CMS 319 may manage content as described above in conjunction with CMSD 112 of FIG. 1. In some embodiments, CMS 319 may be employed by CMSD 112 of FIG. 1. In any event, CMS 319 may employ processes, or parts of processes, similar to those described in conjunction with FIGS. 5 and 6, to perform at least some of its actions.

SDS 320 may be configured to publish content to a channel based on a publishing slot (such as included in time slots 312), as described above in conjunction with SDSD 114 of FIG. 1. In some embodiments, SDS 320 may be employed by SDSD 114 of FIG. 1. In any event, SDS 320 may employ processes, or parts of processes, similar to those described in conjunction with FIGS. 5 and 6, to perform at least some of its actions.

TSMS 321 may be configured to manage a plurality of time slots, such as time slots 312. In some embodiments, TSMS 321 may be configured to enable a publisher to select which time slots are publishing slots. In at least one embodiment, TSMS 321 may manage time slots and publishing slots as described above in conjunction with TSMSD 116 of FIG. 1. In some embodiments, TSMS 321 may be employed by TSMSD 116 of FIG. 1. In any event, TSMS 321 may employ processes, or parts of processes, similar to those described in conjunction with FIGS. 5 and 6, to perform at least some of its actions.

In some embodiments, CMS 319, SDS 320, and/or TSMS 321 may be employed as a single application, separate application, or any combination thereof.

Illustrative System

Figure 4:
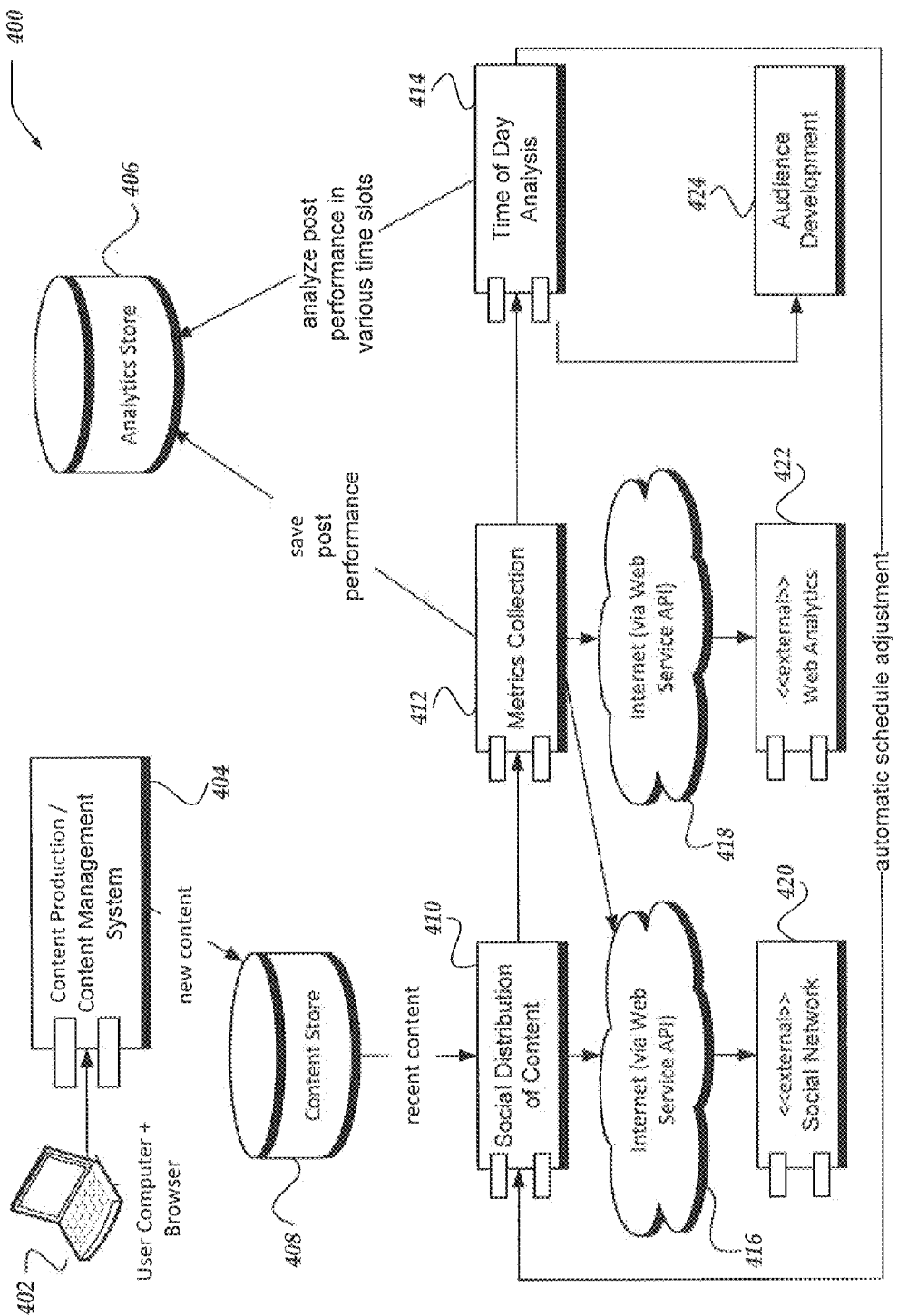
FIG. 4 shows an embodiment of a system diagram that may be employed to publish content to a channel at publishing slots and monitor actions associated with the published content.

FIG. 4 shows an embodiment of a system diagram that may be employed to publish content to a channel at publishing slots and monitor actions associated with the published content. System 400 may include user computer 402, content production/content management system 404, analytics store 406, content store 408, social distribution of content 410, metrics collection 412, time of day analysis 414, internet 416 and 418, Social network 420 Web analytics 422, and audience development 424.

User computer 402 may access content production/content management system 404 to enable a user to generate and/or create content. In at least one of various embodiments, user computer 402 may be an embodiment of client device 200 of FIG. 2. In at least one of various embodiments, content production/content management system 404 may be an embodiment of at least a portion of network device 300 of FIG. 3.

Analytics store 406 may store a plurality of monitored actions, metrics, and/or successes of published content. In some embodiments, monitored actions for published content may be referred to as post performance. In other embodiments, the metrics and/or successes of published content may be referred to as post performance in various time slots. In at least one of various embodiments, analytics store 406 may be an embodiment of at least content 310 and/or time slots 312 of FIG. 3.

Content store 408 may store and/or maintain content, including published and unpublished content. In some embodiments, content store 408 may receive new content generated by a user using content production/content management system 404. In other embodiments, content production/content management system 404 may enable a user of user computer 402 to select previously created content stored at content store 408 for publication. In at least one of various embodiments, content store 408 may be an embodiment of content 310 of FIG. 3.

Social distribution of content 410 may be enabled to distribute content to one or more channels. In some embodiments, the channels may include social network 420. In at least one embodiment, social distribution of content 410 may provide recent content from content store 408 to social network 420 through internet 416. In at least one embodiment, the recent content may be newly created content or previously published content, such as, but not limited to, content published in the last week, month, or the like. In some other embodiments, this content may also have been created by a different publisher.

Metrics collection 412 may be enabled to collect metrics (e.g., success) about each piece of content and determine a success of the content. Metrics collection 412 may be configured to communication with web analytics 420 through internet 418 and/or social network 420 through internet 416. In at least one of various embodiments, internet 416 and/or 418 may be a same network or different networks, which may be embodiments of networks 108 and/or 110 of FIG. 1. Web analytics 420 may be configured to collect actions of users that may be employed to determine the success of content. Metrics collection 412 may store the collected metrics at analytics store 406 for each corresponding published content from social distribution of content 410.

Metrics collection 412 may provide the collected metrics to time of day analysis 414. Time of day analysis 414 may be configured determine if a publishing slot should be moved to a different time slot based on the metrics and/or successes of the published content. In some embodiments, time of day analysis 414 may be in communication with social distribution of content 410 to automatically adjust the scheduling of content publication (i.e., modify at least one publishing slot). In some embodiments, time of day analysis 414 may communicate with audience development to display rankings of publishing slots (or time slots), monitored actions, successes, or the like.

General Operation

The operation of certain aspects of the invention will now be described with respect to FIGS. 5 and 6. In at least one of various embodiments, processes 500 and 600 described in conjunction with FIGS. 5 and 6, respectively, may be implemented by and/or executed on a single network device, such as network device 300 of FIG. 3. In other embodiments, these processes or portions of process thereof may be implemented by and/or executed on a plurality of network devices, such as network device 300 of FIG. 3. However, embodiments are not so limited and various combinations of network devices, or the like, may be utilized.

Figure 5:
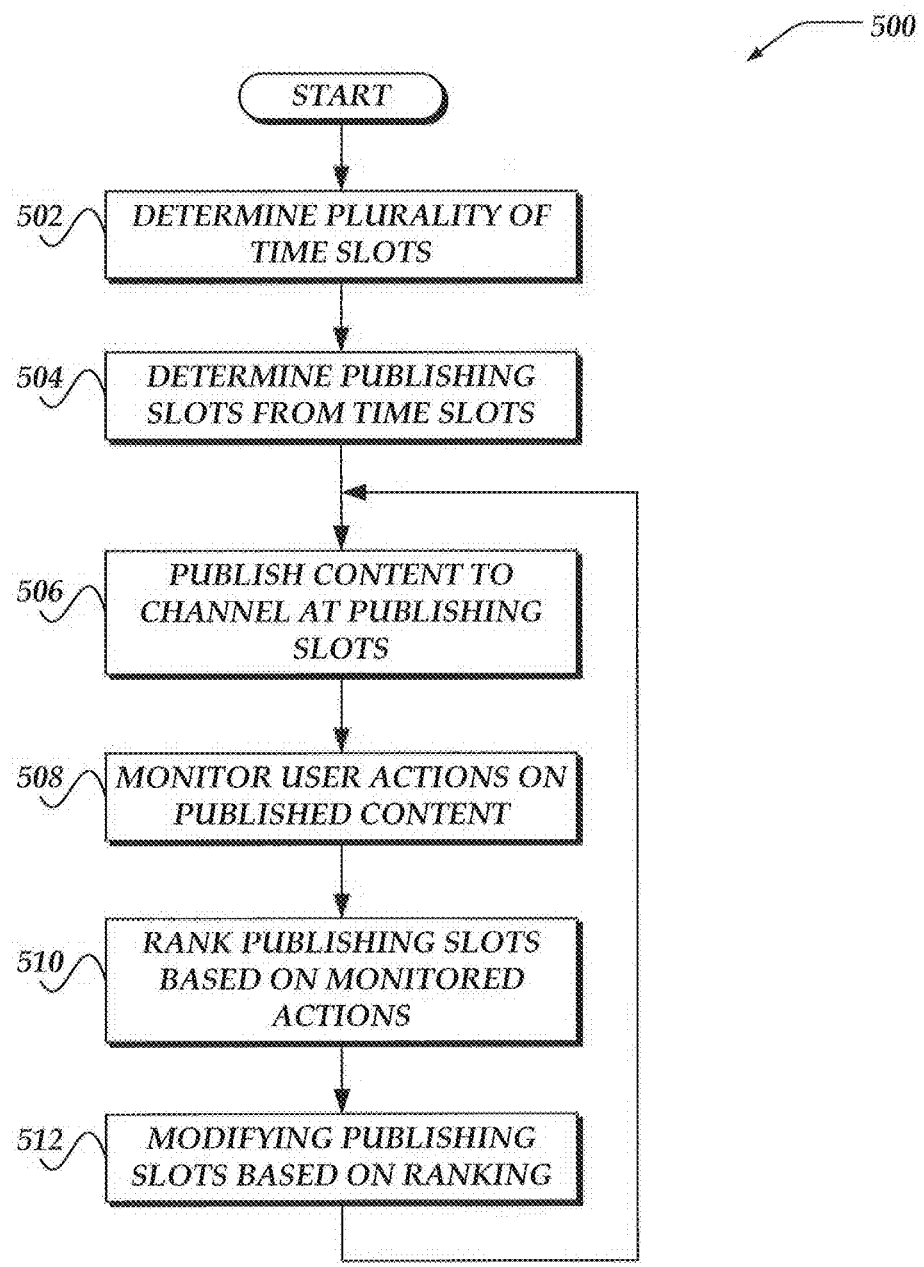
FIG. 5 illustrates a logical flow diagram generally showing one embodiment of an overview process tor modifying publishing slots based on monitored actions associated with content published at the publishing slots.

FIG. 5 illustrates a logical flow diagram generally showing one embodiment of an overview process for modifying publishing slots based on monitored actions associated with content published at the publishing slots. In some embodiments, process 500 of FIG. 5 may be employed for a channel, a category, a plurality of channels, and/or a plurality of channels. For example, process 500 may be employed to determine and optimize the publishing slots for Channel_A, and separately employed to determine and optimize the publishing slots for Channel_B.

Process 500 begins, after a start block, at block 502, where a plurality of time slots may be determined for one or more channels (or categories). In some embodiments, the plurality of time slots may be disbursed across a time interval. This disbursement may be uniform, semi-uniform, random, or the like. In some embodiments, the plurality of tune slots and/or the time distance between time slots may be determined and/or selected by a publisher, editor, audience development staff, marketing team, channel administrator, or the like. In some embodiments, time slots may be clustered at different times within a time interval.

For the following examples, assume a time interval of one day. One non-limiting, non-exhaustive example of a uniform disbursement may include a time slots occurring every 30 minutes all day. One non-limiting, non-exhaustive example of a semi-uniform disbursement may include the a time slot occurring every 30 minutes from 8:00 AM to 8:00 PM, and no time slots from 12:00 AM to 7:59 AM and from 8:01 PM to 11:59 PM. One non-limiting, non-exhaustive example of a clustered disbursement may include a time slot occurring every 15 minutes from 8:00 AM to 10:00 AM and from 5:00 PM to 8:00 PM, every 30 minutes from 10:00 AM to 3:00 PM, and no time slots from 12:00 AM to 7:59 AM and from 8:01 PM to 11:59 PM. However, embodiments are not so limited and other disbursements of time slots may be employed.

In some embodiments, the time distance between time slots may be modified. In at least one embodiment, the time distances may be modified based on the determined success of adjacent publishing slots. For example, if two adjacent publishing slots have a high ranking (as determined at block 510), then a distance between the corresponding time slots may be narrowed, or one or more additional time slots may be added in between the publishing slots. In some embodiments, a minimum time distance between time slots may be employed, such as, for example, 15 minutes.

In any event, process 500 may proceed to block 504, where a plurality of publishing slots may be determined from the plurality of time slots. In some embodiments, the publishing slots may be determined from a plurality of available time slots (i.e., those time slots that do not have a corresponding publishing slot or those time slots that are currently unused as publishing slots). In at least one embodiment, the publishing slots may be initially randomly selected from the time slots. In another embodiment, the plurality of publishing slots may be selected from the time slots by a publisher, editor, audience development staff, marketing team, channel administrator, or the like. In some embodiments, each of the plurality of publishing slots may correspond to a different time slot. For example, assume time slots are every 30 minutes from 8:00 AM to 8:00 PM for a given day. The publishing slots may be determined to be at 8:00 AM, 12:30 PM, and 5:00 PM. Embodiments are not so limited and other numbers of time slots, numbers of publishing slots, time distance between time slots, or the like may be employed. In at least one embodiment, one or more time slots may include two or more corresponding publishing slots.

In some embodiments, the publishing slots for a given time interval may repeat as the time interval repeats. For example, the publishing slots of 8:00 AM, 12:30 PM, and 5:00 PM may repeat each day, assuming the time interval is one day (until and if a publishing slot is modified).

In some embodiments, a number of publishing slots may be determined based on a minimum and/or maximum number of content pieces published within a time interval. For example, a publisher may determine to publish 30 content pieces (either new content or republish old content) every week—so the number of publishing slots for the time interval may be 30 publishing slots per week.

In at least one of various embodiments, the number of publishing slots may be disbursed within the time interval based on time sub-intervals. In some embodiments, each time sub-interval may have a minimum and/or maximum number of publishing slots, which may be determined, in at least one embodiment, by the publisher, editor, audience development staff, marketing team, channel administrator, or the like. In various embodiments, each time sub-interval may have a same and/or different minimum and/or maximum number of publishing slots as other time sub-intervals. For example, a time interval of one week may be divided into one day time sub-intervals, where each day has a minimum and/or maximum number of possible publishing slots. So, continuing the example above, the 30 publishing slots may be disbursed into five publishing slots for each of Monday-Friday, three for Saturday, and two for Sunday. However, embodiments are not so limited and other numbers of publishing slots, disbursements of publishing slots, or the like, may be employed. So the number of publishing slots per time interval or time sub-interval may be the same or may be different.

Process 500 may continue at block 506, where content may be published to the channel for each of the plurality of publishing slots. In some embodiments, same or different content may be published to the channel at the publishing slots. In at least one of various embodiments, content may be published to the channel when a wall clock of the publisher matches a time corresponding to a publishing slot. For example, assume publishing slots at 8:00 AM, 12:30 PM, and 5:00 PM, a first content piece may be published to the channel when the wall clock reads 8:00 AM. The publisher may wait until the wall clock reads 12:30 PM before publishing a second content piece, and then wait until the wall clock reads 5:00 PM before publishing a third content piece. For this example, a next content piece may be published the next day at 8:00 AM, when the time interval and publishing slots repeat. In some embodiments, block 506 may repeat for a plurality of time intervals. So, a plurality of content is published to the channel at each publishing slot.

Process 500 may proceed next to block 508, where user actions associated with the published content may be monitored for each publishing slot. In some embodiments, the actions may include those actions performed by users on the content, such as, for example, accessing the content (e.g., clicking on the content), providing a comment, transfers, sharing the content, accessing the content for more than a threshold amount of time, or any combination thereof, or the like. In some other embodiments, outliers, such as significant events, may be excluded from being monitored (and/or included to rank the publishing slots at block 510).

In at least one of various embodiments, user actions may be monitored for a plurality of content pieces separate for each publishing slot. So, in some embodiments, separate user actions may be monitored for each publishing slot. In are least one of various embodiments, the actions associated with content published at a particular publishing slot may be monitored for a predetermined period of time or over a predetermined number of repeated time intervals, which may be based on a content sample size (e.g., a minimum number of 10 content pieces published at each publishing slot). Such monitoring may generate a histogram of actions (e.g., transfers) and/or successes per time interval and/or per time sub-interval.

Process 500 may continue next at block 510, where the plurality of publishing slots may be ranked based on the monitored actions. In some embodiments, the publishing slots may be ranked based on one or more types of user action, for example, number of clicks, or based on a combination of a plurality of types of user actions. In at least one of various embodiments, the publishing slots may be ranked from lowest to highest, where the lowest has the fewest actions for an action type and the highest has the most actions for the action type. For example, a publishing slot with an average number of clicks per piece of content per hour of 20 may be ranked higher than another publishing slot with an average number of clicks per piece of content per hour of 11.

Process 500 may proceed to block 512, where at least one of the plurality of publishing slots may be modified based on a rank of each the publishing slots. In at least one of various embodiments, modifying a publishing slot may include moving the publishing slot to a different time slot. For example, a publishing slot of 6:00 AM may be moved to 7:30 PM, such that there is no longer a publishing slot at 6:00 AM.

In some embodiments, a lowest ranking publishing slot may be moved to one of the plurality of available time slots proximate to a highest ranking publishing slot. In at least one such embodiment, the lowest ranking publishing slot may be moved to an unused time slot (e.g., a time slot that does not currently have a corresponding publishing slot) closest to the highest ranking publishing slot. In some embodiments, a closest time slot may be a time slot with a smallest time distance to the publishing slot. For example, if the time slots are every 30 minutes and a highest publishing slot is at 5:00 PM, then the closest time slots would be 4:30 PM and 5:30 PM. If one of these time slots is unused (or is determined to be available), then a lowest publishing slot may be moved to this unused time slot. Similarly, a second lowest ranking publishing slot may be moved to an unused time slot proximate to a second highest ranking publishing slot, and so on.

In other embodiments, a lowest ranking publishing slot may be moved to one of the plurality of time slots (e.g., an unused time slot) that is between two other publishing slots that have a highest average ranking (or ranking above a threshold). In at least one embodiment, at least one new tune slot may be added in between the other publishing slots that have a highest average ranking (or average ranking above a threshold) and at least one of the lowest ranking publishing slots may be moved to this new time slot.

In yet other embodiments, a lowest ranking publishing slot (or ranking below a threshold) may be moved to a time sub-interval with a highest average publishing slot ranking (or average ranking above a threshold). For example, the rankings of the publishing slots may be averaged for each day of the week. A lowest ranking publishing slot may be moved an unused time slot on the day with the highest average ranking. Similarly, a second lowest ranking publishing slot may be moved to an unused time slot on a day with a second highest average ranking, and so on. In some embodiments, a plurality of lower ranking publishing slots may be modified. For example, the lowest ranking 30% of the publishing slot may be modified.

In some other embodiments, one or more lower ranking for ranking below a threshold) publishing slots may be moved to random available time slots or to a random new time slot. In some embodiments, each of the plurality of time slots that are unused as publishing slots (i.e., available time slots) may be ranked based at least on the ranking of the plurality of publishing slots and a corresponding distance to the plurality of publishing slots. In at least one such embodiment, a lowest ranking publishing slot may be moved to a highest ranking unused time slot. So in some embodiments, all time slots that do not have historical data (e.g., user actions and/or successes) may be ranked by a combination of at least two factors: 1) their time distance from time slots (or publishing slots) that have historical data and 2) the average success (or ranking) for the publishing slots of a given time sub-interval, relative to other time sub-intervals.

Alter block 512, process 500 may loop to block 506 to continue to publish content to the channel at the plurality of publishing slots, including the fit least one modified publishing slot. In some embodiments, if a publishing slot is modified (or moved), then the success of the moved publishing slot may be compared to its original publishing slot. In at least one embodiment, if the moved publishing slot has a higher success (e.g., a higher number of clicks per minute) than a success of the original publishing slot, then the move may persist to future time intervals; otherwise, the publishing slot may revert back to its original publishing slot.

In other embodiments, process 500 may be employed tor a given period of time, such as, for example, three weeks, to determine optimal publishing slots for a time interval. In at least one embodiment, once the publishing slots are optimized, process 500 may return to a calling process to perform other actions. In at least one embodiment, process 500 may reinitiate at a later time (randomly, at a predetermined time, determined by the publisher, a success of a predetermined number of publishing slots falls below a threshold, or the like) to retest and/or modify the publishing slots.

Figure 6:
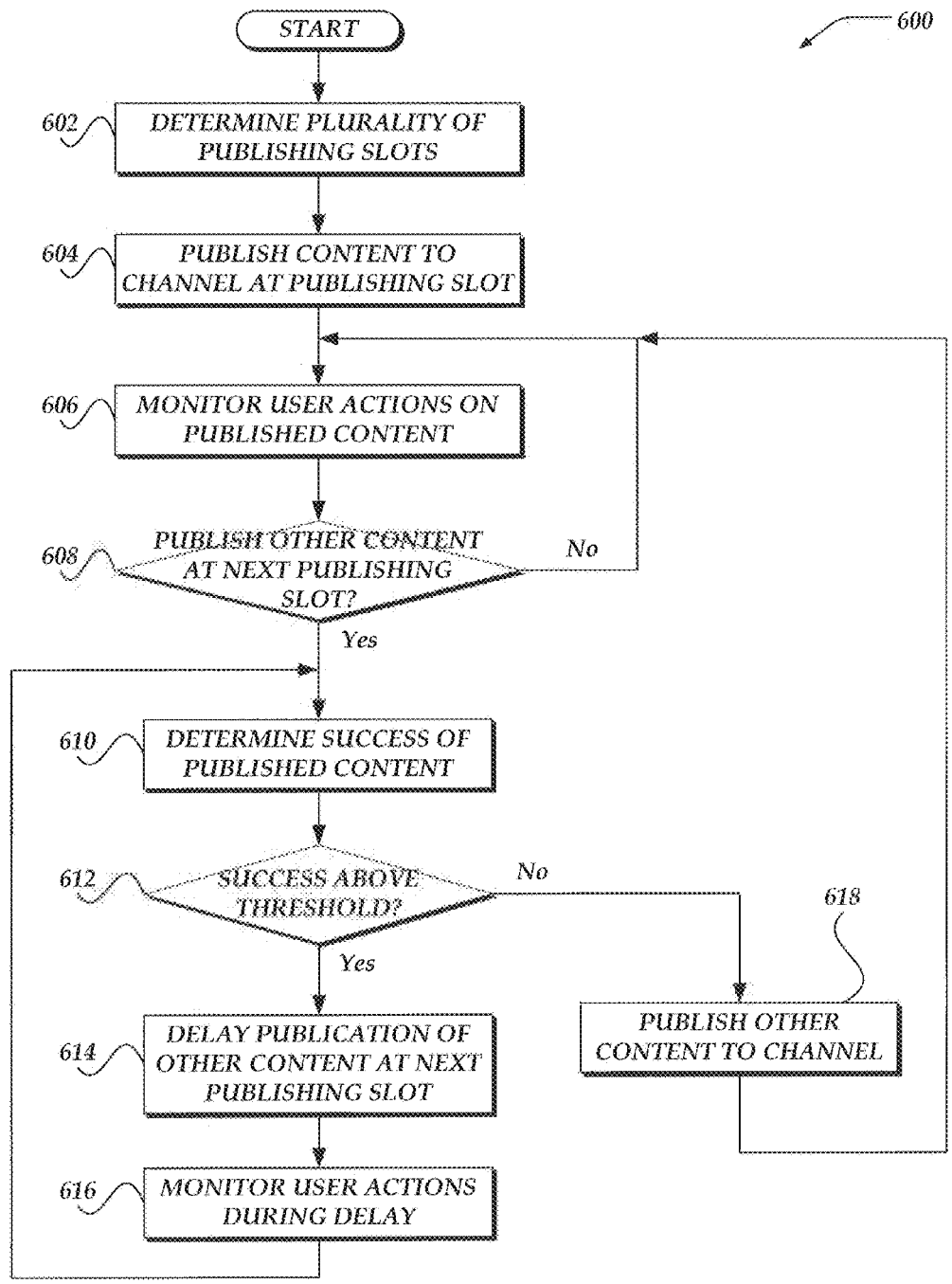
FIG. 6 illustrates a logical flow diagram generally showing one embodiment of a process for delaying publication of content at publishing slot based on monitored actions associated with other content published at a previous publishing slot.

FIG. 6 illustrates a logical flow diagram generally showing one embodiment of a process for delaying publication of content at publishing slot based on monitored actions associated with other content published at a previous publishing slot. Process 600 begins, after a start block, at block 602, where a plurality of publishing slots may be determined. In at least one of various embodiments, block 602 may employ embodiments of block 504 of FIG. 5. In other embodiments, the plurality of publishing slots may be determined by employed embodiments of process 500 of FIG. 5.

Process 600 may proceed to block 604, where content may be published to the channel at a next publishing slot. In at least one embodiment, publishing the content to the channel may include posting and/or otherwise providing the content to the channel. In some embodiments, the content may be newly generated content or previously published content. In at least one embodiment, the content may be published to the channel at a time corresponding to publishing slot. For example, if the publishing slot is 8:00 AM, then the content may be published to the channel when a wall clock of the publisher reads 8:00 AM. However, embodiments are not so limited and other times of publishing slot may be employed.

Process 600 may continue at block 606, where user actions associated with published content may be monitored. In at least one of various embodiments, the monitored actions may include those actions performed by users and/or an audience on the content, such as, for example, accessing the content (e.g., clicking on the content), providing a comment, sharing the content, accessing the content for more than a threshold amount of time, or any combination thereof, or the like.

Process 600 may proceed next to decision block 608, where a determination may be made whether other content can be published at a next publishing slot. In at least one of various embodiments, this determination may be based on a wall clock of the publisher. If a time of the wall clock matches the time that corresponds to the next publishing slot, then other content may be published to the channel. In at least one embodiment, decision block 608 may determine if other content is ready to be published to the channel (e.g., at the next publishing slot), but may not publish the other content (e.g., until block 618). In some embodiments, the other content may not be published to the channel prior to the next publishing slot. If the other content can be published at the next publishing slot, then process 600 may flow to block 610; otherwise, process 600 may loop to block 606, to continue to monitor user actions on the published content.

At block 610, a success of the published content may be determined. In at least one embodiment, the success may be a metric and/or value that indicates how the published content performed on the channel. In some embodiments, the success may be a total number of actions performed on the published content. In other embodiments, the success may be an average number of actions performed on the published content for a predetermined time period (e.g., 100 clicks per minute). However, embodiments are not so limited and other methods and/or algorithms for calculating a success of content.

Process 600 may continue next at decision block 612, where a determination may be made whether the success of the published content is above a threshold. In at least one embodiment, the threshold may be a static and/or predetermined threshold. For example, the threshold may be 50 clicks per minute—so, if the success of the published content is 75 clicks per minute, the success may be above the threshold.

In other embodiments, the threshold may be dynamic and/or determined based on a success of the published content determined for the duration between the time the content was published (i.e., the publishing slot) and the next publishing slot. In at least one such embodiment, the threshold may be based on—or a factor of—an initially calculated success of the published content, for example, the threshold may be 5% of an initial success that may be determined from the first live minutes of publication (e.g., from the tine the content is published at the publishing slot to five minutes after the publishing slot). In another embodiment, the threshold may be based on—or a factor of—a maximum calculated success of the published content. For example, the threshold may be 5% of a maximum success determined from the time the content is first published to the next publishing slot. In at least one such embodiment, the success of the published content may be continually determined from the time the content is published to the next publishing slot. However, embodiments are not so limited and other thresholds and/or successes may be employed.

If the success is above the threshold, then process 600 may flow to block 614; otherwise, process 600 may flow to block 618.

At block 614, the publication of the other content at the next publishing slot may be delayed, in at least one embodiment, such a delay may include waiting to publish the other content until alter the success of the previously published content fails below the threshold (e.g., at decision block 612). In some embodiments, this delay of the publishing of content may be referred to as a delayed publishing slot. Delaying this publication of other content may limit cannibalization of an audience by neighboring publishing slots.

In at least one embodiment, a publishing slot may be delayed for a current time interval (or time sub-interval), but may remain unchanged for a next time interval tor time sub-interval). For example, assume a time interval of one day—if publishing content at a 10:00 AM publishing slot is delayed—due to previously published content at an 8:00 AM publishing slot—until 11:00 AM, the 10:00 AM publishing slot may remain and/or stay at 10:00 AM the following day. In some embodiments, however, the 10:00 publishing slot may be modified by employing embodiments described above in conjunction with FIG. 5.

Process 600 may proceed to block 616, where user actions associated with the previously published content may continue to be monitored during the delay of publishing the other content. In at least one embodiment block 616 may employ embodiments of block 606 to monitor user actions.

Alter block 616, process 600 may loop to block 610 to continually determine the success of the published content during the delay until the success is above the threshold (e.g., as determined at decision block 612). In some embodiments, a publishing slot may be delayed until a next or following publishing slot. In at least one such embodiment, publication of the other content at the delayed publishing slot may be canceled and the other content may be published at a next publishing slot after the delayed publishing slot. In some embodiments, one publishing slot may be delayed, but in other embodiments, a plurality of publishing slots may be delayed.

If, at decision block 612, the success is not above the threshold (or the success falls below the threshold while the next publishing slot is being delayed), then process 600 may flow from decision block 612 to block 618. At block 618, the other content may be published to the channel. In some embodiments, the other content may be published to the channel at the next publishing slots, if the next publishing slot is not delayed. In other embodiments, if the publishing slot is delayed, then the other content may be published to the channel at a time when the success of the previous content tails below the threshold or at a next publishing slot after the delayed publishing slot. In at least one of various embodiments, block 618 may employ embodiments of block 604 to publish the other content to the channel. After block 618, process 600 may loop to block 606 to monitor user actions associated with the published other content.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Use Case Embodiments

FIG. 7 shows a use case illustration of an embodiment of a plurality of time slots and publishing slots for determining when to publish content to a channel. Example 700 may include tune slots 702 for interval 704. As illustrated, time slots 702 may include a plurality of time slots, where each time slot is represented by an individual cell in the table. Time slots 702 may be uniformly distributed, such as every 30 minutes between 8:00 AM and 7:00 PM. Interval 704 may be for a one day time period and may repeat every day. However, of other intervals may be employed. By employing embodiments described above, a plurality of publishing slots may be determined from time slots 702. A cell with an "X" may indicate a publishing slot, such as cell 706. Available time slots that are unused as publishing slots may be illustrated as a blank or empty cell, such as cell 708. As illustrated, interval 704 may repeat every day of the week, such that the publishing slots are the same from one day to the next. Example 700 illustrates a plurality of publishing slots that are focused around commute times (e.g., 8:30 AM to 10:00 AM and 4:30 PM to 6:00 PM) and lunch time. However, embodiments are not so limited and other publishing slots may be employed. Additionally, publishing slots may be modified and/or moved through the implementation of embodiments described herein.

FIG. 8 shows a use case illustration of an alternative embodiment of a plurality of time slots and publishing slots for determining when to publish content to a channel. Example 800 may include time slots 802 for interval 804. As illustrated, time slots 802 may include a plurality of rime slots, where each time slot is represented by an individual cell in the table. Time slots 802 may be uniformly distributed, such as every 30 minutes between 8:00 AM and 7:00 PM.

By employing embodiments described above, a plurality of publishing slots may be determined from time slots 802 for interval 804. A cell with an "X" may indicate a publishing slot, such as cell 810. Available time slots that are unused as publishing slots may be illustrated as a blank or empty cell, such as cell 812.

Interval 804 may be for a one week time period and may repeat every week, such that the publishing slots are the same from one week to the next. Interval 804 may include a plurality of time sub-intervals, such as sub-intervals 806 and 808. As illustrated each time sub-interval may be a different day of the week. Each sub-interval may include a same or different minimum and/or maximum possible publishing slots for the corresponding sub-interval. For example, sub-interval 806 may have a minimum of five publishing slots and a maximum of eight publishing slots, whereas sub-interval 808 may have a minimum of two publishing slots and a maximum of eight publishing slots. However, embodiments are not so limited and other numbers of maximum and/or minimum number of publishing slots may be employed. Similarly, interval 804 may include a minimum and/or maximum number of publishing slots.

In some embodiments, the publishing slots may dynamically change over time by employing embodiments described herein. For example, by employing embodiments described herein, it may be determined that "publishing slot A" (e.g., cell 810) has a lowest ranking and "publishing slot B" has a highest ranking (e.g., cell 814). Publishing slot A may be moved from cells 810 to an available time slot proximate or closest to publishing slot B, such as cell 816. However, publishing slot A may be moved to other available time slots. For example, in at least one embodiment, publishing slot A may be moved to an available time slot that was not previously used as a publishing slot. It should be noted, that a publishing slot may not move to a sub-interval if the moved publishing slot would exceed the maximum number of publishing slots for the sub-interval. Similarly, a publishing slot may not move to a different sub-interval it moving the publishing slot would reduce a current sub-interval to be below a minimum number of publishing slots.

Figure 9:
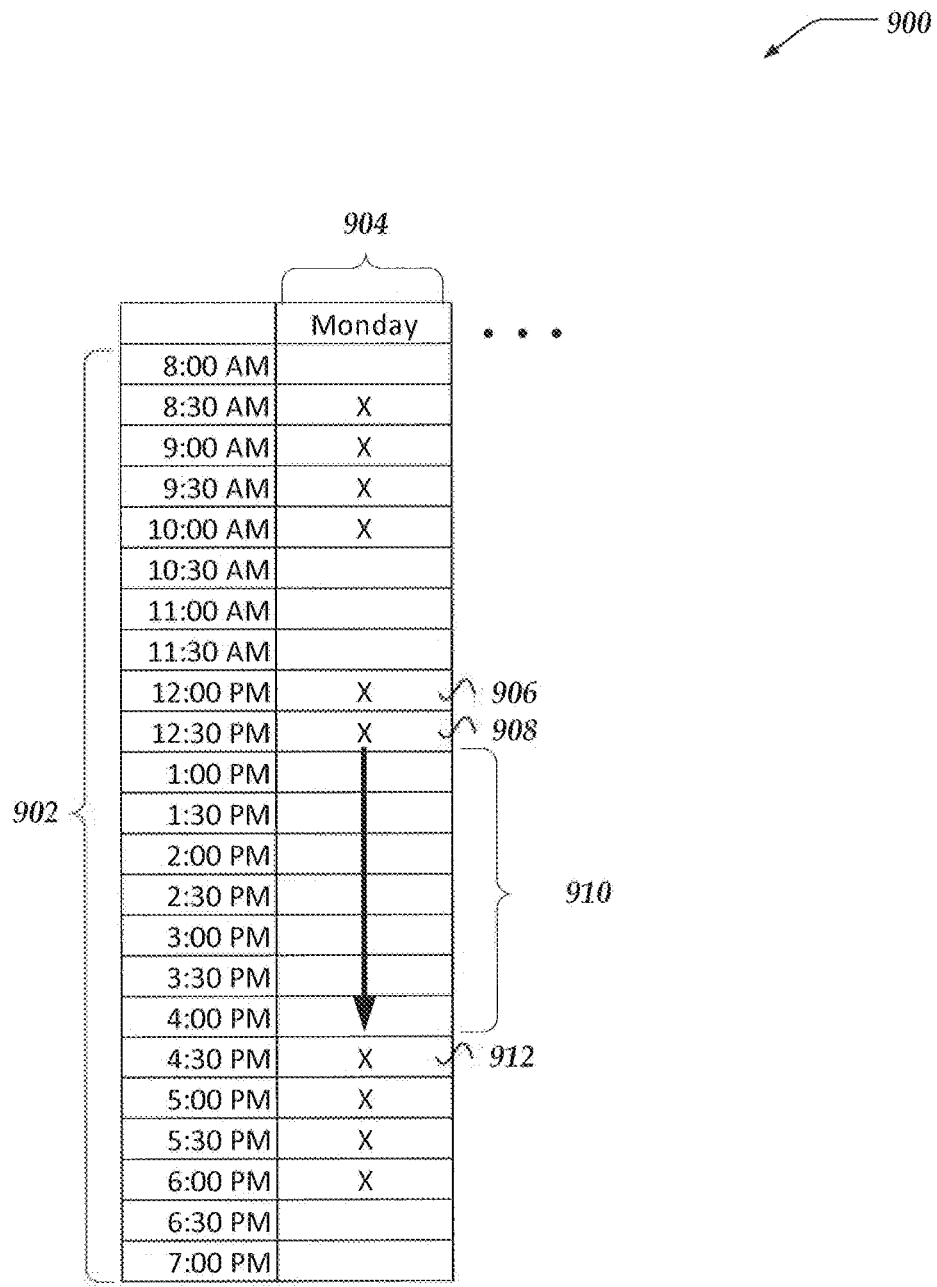
FIG. 9 shows a use case illustration of an embodiment of delaying publication of content to a channel.

FIG. 9 shows a use case illustration of an embodiment of delaying publication of content to a channel. Example 900 may include time slots 902 for interval 904. As illustrated, time slots 902 may include a plurality of time slots, where each time slot is represented by an individual cell in the table. Time slots 902 may be an embodiment of time slots 702 of FIG. 7, and interval 904 may be an embodiment of interval 704 of FIG. 7.

By employing embodiments described above, the publication of content at publishing slot 908 may be delayed. For example, assume content_A is published to the channel at publishing slot 906. User actions associated with the published content may be monitored from 12:00 PM until 12:30 PM. If a success based on the user actions is above a threshold, then the publication of content_B at publishing slot 908 may be delayed, as illustrated by delay 910. In at least one embodiment, content_B may be published to the channel at any point the success of content_A falls below the threshold. In another embodiment, the publication of content_B at publishing slot 908 may be canceled, and content_B may be published at publishing slot 912 (i.e., the next publishing slot alter the delayed publishing slot).

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for managing content over a network, wherein at least one network device performs actions, comprising:
   publishing content to at least one channel for at least one of a plurality of publishing slots that is determined from one of a plurality of time slots that are disbursed over a time interval;
   monitoring actions associated with the published content; and
   modifying at least one of the publishing slots having published content to a different one of the plurality of time slots based on the monitored actions, wherein each time sub-interval maintains a minimum number of publishing slots without exceeding a maximum number of publishing slots, and wherein each previous time slot associated with the at least one modified publishing slot becomes an unused time slot for publishing content.

2. The method of claim 1, further comprising:
   determining a success of the published content based at least on the monitored actions; and
   modifying a time distance between at least two time slots of the plurality of time slots based on the success of publishing slots associated with the at least two time slots.

3. The method of claim 1, further comprising delaying publication of content for a publishing slot based on the monitored actions of a previous publishing slot.

4. The method of claim 1, further comprising delaying publication of content for a publishing slot if the monitored actions of a previous publishing slot are above a threshold.

5. The method of claim 1, wherein modifying the at least one of the publishing slots further comprises:
   ranking each of the plurality of publishing slots based on the monitoring actions; and
   moving a lower ranking publishing slot to one of the plurality of time slots proximate to a higher ranking publishing slot.

6. The method of claim 1, wherein modifying the at least one of the publishing slots further comprises:
   ranking each of the plurality of publishing slots based on the monitoring actions; and
   moving a lowest ranking publishing slot to one of the plurality of time slots that is between two other publishing slots that have a highest average ranking.

7. The method of claim 1, wherein modifying the at least one of the publishing slots further comprises:
   ranking each of the plurality of publishing skits based on the monitoring actions;
   adding a new time slot to the plurality of time slots between two publishing slots that have a highest average ranking; and
   moving a lowest ranking publishing slot to the new time slot.

8. The method of claim 1, wherein modifying the at least one of the publishing slots further comprises:
   ranking each of the plurality of publishing slots based on the monitoring actions; and
   moving a publishing slots that is ranked below a threshold to a random time slot.

9. A system for managing content over a network, comprising:
   a content publication computer that is operative to publish content to at least one channel for at least one of a plurality of publishing slots that is determined from one of a plurality of time slots that are disbursed over a time interval;
   a content monitoring computer that is operative to monitor actions associated with the published content; and a time slot management computer that is operative to modify at least one of the publishing slots having published content to a different one of the plurality of time slots based on the monitored actions, wherein each time sub-interval maintains a minimum number of publishing slots without exceeding a maximum number of publishing slots and wherein each previous time slot associated with the at least one modified publishing slot becomes an unused time slot for publishing content.

10. The system of claim 9, wherein the content monitoring computer is operative to determine a success of the published content based at least on the monitored actions, and wherein the time slot management computer is operative to modify a time distance between at least two time slots of the plurality of time slots based on the success of publishing slots associated with the at least two time slots.

11. The system of claim 9, wherein the tune slot management computer is operative delay publication of content for a publishing slot based on the monitored actions of a previous publishing slot.

12. The system of claim 9, wherein the time slot management computer is operative to rank each of the plurality of publishing slots based on the monitoring actions and to move a lower ranking publishing slot to one of the plurality of time slots proximate to a higher ranking publishing slot.

13. The system of claim 9, wherein the time slot management component is operative to rank each of the plurality of publishing slots based on the monitoring actions and to move a lowest ranking publishing slot to one of the plurality of time slots that is between two other publishing slots that have a highest average ranking.

14. The system of claim 9, wherein the time slot management computer is operative to rank each of the plurality of publishing slots based on the monitoring actions, add a new time slot to the plurality of time slots between two publishing slots that have a highest average ranking, and move a lowest ranking publishing slot to the new time slot.

15. The system of claim 9, wherein the time slot management computer is operative to rank each of the plurality of publishing slots based on the monitoring actions and to move a publishing slots that is ranked below a threshold to a random time slot.

16. A processor readable non-transitory storage media that includes instructions for managing content over a network, wherein the execution of the instructions by a processor enables actions, comprising:
publishing content to at least one channel for at least one of a plurality of publishing slots that is determined from one of a plurality of time slots that are disbursed over a time interval;
monitoring actions associated with the published content; and
modifying at least one of the publishing slots having published content to a different one of the plurality of time slots based on the monitored actions, wherein each tune sub-interval maintains a minimum number of publishing slots without exceeding a maximum number of publishing slots, and wherein each previous time slot associated with the at least one modified publishig slot becomes an unused time slot for publishing content.

17. The media of claim 16, further comprising:
determining a success of the published content based at least on the monitored actions; and
modifying a time distance between at least two time slots of the plurality of time slots based on the success of publishing slots associated with the at least two time slots.

18. The media of claim 16, further comprising delaying publication of content for a publishing slot based on the monitored actions of a previous publishing slot.

19. The media of claim 16, wherein modifying the at least one of the publishing slots further comprises:
ranking each of the plurality of publishing slots based on the monitoring actions; and
moving a lower ranking publishing slot to one of the plurality of time slots proximate to a higher ranking publishing slot.

20. The media of claim 16, wherein modifying the at least one of the publishing slots further comprises:
ranking each of the plurality of publishing slots based on the monitoring actions; and
moving a lowest ranking publishing slot to one of the plurality of time slots that is between two other publishing slots that have a highest average ranking.

21. The media of claim 16, wherein modifying the at least one of the publishing slots further comprises:
ranking each of the plurality of publishing slots based on the monitoring actions;
adding a new time slot to the plurality of time slots between two publishing slots that have a highest average ranking; and
moving a lowest ranking publishing slot to the new time slot.

22. The media of claim 16, wherein modifying the at least one of the publishing slots further comprises:
ranking each of the plurality of publishing slots based on the monitoring actions; and
moving a publishing slots that is ranked below a threshold to a random time slot.

23. A network device for managing content over a network, comprising:
a memory that stores instructions; and
a processor that executes the instructions to enable actions, including:
publishing content to at least one channel for at least one of a plurality of publishing slots that is determined from one of a plurality of time slots that are disbursed over a time interval;
monitoring actions associated with the published content; and
modifying at least one of the publishing slots having published content to a different one of the plurality of time slots based on the monitored actions, wherein each time sub-interval maintains a minimum number of publishing slots without exceeding a maximum number of publishing slots, and wherein each previous time slot associated with the at least one modified publishig slot becomes an unused time slot for publishing content.

24. The network device of claim 23, where the processor executes the instructions to enable further actions comprising:
determining a success of the published content based at least on the monitored actions; and
modifying a time distance between at least two time slots of the plurality of time slots based on the success of publishing slots associated with the at least two time slots.

25. The network device of claim 23, further comprising delaying publication of content for a publishing slot based on the monitored actions of a previous publishing slot.

26. The network device of claim 23, further comprising delaying publication of content for a publishing slot if the monitored actions of a previous publishing slot are above a threshold.

27. The network device of claim 23, wherein modifying the at least one of the publishing slots further comprises:
   ranking each of the plurality of publishing slots based on the monitoring actions; and
   moving a lower ranking publishing slot to one of the plurality of time slots proximate to a higher ranking publishing slot.

28. The network device of claim 23, wherein modifying the at least one of the publishing slots further comprises:
   ranking each of the plurality of publishing slots based on the monitoring actions; and
   moving a lowest ranking publishing slot to one of the plurality of time slots that is between two other publishing slots that have a highest average ranking.

29. The network device of claim 23, wherein modifying the at least one of the publishing slots further comprises:
   ranking each of the plurality of publishing slots based on the monitoring actions;
   adding a new time slot to the plurality of time slots between two publishing slots that have a highest average ranking; and
   moving a lowest ranking publishing slot to the new time slot.

30. The network device of claim 23, wherein modifying the at least one of the publishing slots further comprises:
   ranking each of the plurality of publishing slots based on the monitoring actions; and
   moving a publishing slots that is ranked below a threshold to a random time slot.

* * * * *